(12) United States Patent
Hsu et al.

(10) Patent No.: US 9,135,199 B2
(45) Date of Patent: Sep. 15, 2015

(54) SYSTEM AND METHOD FOR SIGNAL INPUT CONTROL AND VIDEO DEVICE THEREOF

(71) Applicant: AmTRAN TECHNOLOGY Co., Ltd., New Taipei (TW)

(72) Inventors: Shih-Shun Hsu, New Taipei (TW); Chin-Huang Chen, New Taipei (TW)

(73) Assignee: AmTRAN TECHNOLOGY Co., Ltd., New Taipei (TW)

( * ) Notice: Subject to any disclaimer, the term of this patent is extended or adjusted under 35 U.S.C. 154(b) by 404 days.

(21) Appl. No.: 13/721,065

(22) Filed: Dec. 20, 2012

(65) Prior Publication Data

US 2014/0068136 A1   Mar. 6, 2014

(30) Foreign Application Priority Data

Aug. 29, 2012  (TW) .............................. 101131374 A

(51) Int. Cl.
| | |
|---|---|
| G06F 13/40 | (2006.01) |
| H04N 21/4363 | (2011.01) |
| H04N 21/442 | (2011.01) |
| G09G 5/00 | (2006.01) |

(52) U.S. Cl.
CPC ............ *G06F 13/4022* (2013.01); *G09G 5/003* (2013.01); *H04N 21/43635* (2013.01); *H04N 21/44227* (2013.01); *G09G 2370/047* (2013.01)

(58) Field of Classification Search
CPC ......... G06F 13/4022; G09G 2370/04–2370/24
USPC ......................................................... 710/317
See application file for complete search history.

(56) References Cited

U.S. PATENT DOCUMENTS

| | | | | |
|---|---|---|---|---|
| 6,914,637 | B1* | 7/2005 | Wolf et al. .................... | 348/473 |
| 7,626,954 | B2* | 12/2009 | Saito ............................. | 370/282 |
| 7,817,586 | B2* | 10/2010 | Hsieh ............................ | 370/282 |
| 7,936,401 | B2* | 5/2011 | Nakajima et al. ............. | 348/723 |
| 7,945,708 | B2* | 5/2011 | Ohkita ............................ | 710/14 |
| 8,069,276 | B2* | 11/2011 | Kang et al. ..................... | 710/10 |
| 8,459,805 | B2* | 6/2013 | Nakagawa et al. ........... | 353/122 |
| 8,972,626 | B2* | 3/2015 | Sasaki et al. .................... | 710/38 |

* cited by examiner

*Primary Examiner* — Brian Misiura
(74) *Attorney, Agent, or Firm* — Jianq Chyun IP Office

(57) ABSTRACT

A system and method for signal input control and a video device thereof are provided, adapted for a control device controlling the signal input to the video device. The method includes the following steps: the control device provides a process information and a control command; the video device detects the control commands and receives the process information through a Display Data Channel (DDC); and the video device controls the switch unit to transmit the process information to the Extended Display Identification Data (EDID) ROM or the processor according to the control command.

15 Claims, 3 Drawing Sheets

| +5V Power Line Input Voltage | Switch Unit | | Variable N | Connection Mode |
|---|---|---|---|---|
| | S1 | S0 | | |
| 5 V | 1 | 1 | 3 | Normal Mode |
| 0 V | 0 | 0 | 0 | Specific Mode |

FIG. 3A

| HPD Line Input Voltage | Switch Unit | | Variable N | Connection Mode |
|---|---|---|---|---|
| | S1 | S0 | | |
| 5 V | 1 | 1 | 3 | Normal Mode |
| 0 V | 0 | 0 | 0 | Specific Mode |

FIG. 3B

| Utility Line Input Voltage | Switch Unit | | Variable N | Connection Mode |
|---|---|---|---|---|
| | S1 | S0 | | |
| 0 V | 1 | 1 | 3 | Normal Mode |
| 9 V | 0 | 1 | 1 | First Specific Mode |
| 14 V | 0 | 0 | 0 | Second Specific Mode |
| 21 V | 1 | 0 | 2 | Third Specific Mode |

FIG. 3C

SYSTEM AND METHOD FOR SIGNAL INPUT CONTROL AND VIDEO DEVICE THEREOF

CROSS-REFERENCE TO RELATED APPLICATION

This application claims the priority benefit of Taiwan application serial no. 101131374, filed on Aug. 29, 2012. The entirety of the above-mentioned patent application is hereby incorporated by reference herein and made a part of this specification.

BACKGROUND

1. Technical Field

The invention relates generally to a system and a method for signal input control and a video device thereof, and more particularly to a system and a method for signal input control using a High Definition Multimedia Interface (HDMI) and a video device thereof.

2. Related Art

In current technologies, the High Definition Multimedia Interface (HDMI) is a fully digitized image and audio transmission interface capable of transmitting uncompressed audio signals and image signals. Since HDMI allows simultaneous transmission of audio and image signals in the same cable, system installation is drastically simplified. HDMI is chiefly applied in electronic or video devices such as multimedia players, personal computers, console gaming systems, integrated amplifiers, digital audio systems, and televisions. The video devices adopting the HDMI connectors have a Display Data Channel (DDC) that only transmits the Extended Display Identification Data (EDID). However, when the system manufacturer needs to debug, perform code upgrades, maintain equipment, or perform pre-shipment tests, other circuit channels would need to be designed to transfer the control commands, which leads to inconvenient operation or adds to the system cost.

SUMMARY

The invention provides a system for signal input control adapted for a High Definition Multimedia Interface (HDMI), in which the system includes a control device and a video device. The control device provides a process information and a control command. The video device is connected to the control device through the HDMI. Moreover, the video device includes a switch unit, an Extended Display Identification Data (EDID) ROM, a processor, and a detection circuit. The switch unit receives the process information through a Display Data Channel (DDC). The detection circuit detects the control command of the control device, and the detection circuit controls a connection mode of the switch unit in the video device according to the control command. The connection mode is respectively a normal mode and a specific mode, in which the normal mode is for transmitting the process information to the EDID ROM through the switch unit, and the specific mode is for transmitting the process information to the processor through the switch unit.

According to an embodiment of the invention, the control device includes a process unit and a control circuit. The process unit provides the process information, the process information being transmitted to the switch unit of the video device through the DDC. The control circuit provides the control command, in which the control command is a specific voltage, and the specific voltage is an adjustable voltage. Moreover, the switch unit is controlled to transmit the process information to the EDID ROM or the processor according to a value of the specific voltage.

According to an embodiment of the invention, the video device further includes a detection circuit. The detection circuit is connected to the control circuit through a utility line, a Hot Plug Detection (HPD) line, or a +5V power line of the HDMI. After detecting the specific voltage, the detection circuit switches the connection mode of the switch unit according to the specific voltage, the connection mode determining whether the switch unit transmits the process information to the EDID ROM or the processor.

According to an embodiment of the invention, when the specific voltage is inputted in the detection circuit from the +5V power line and the specific voltage is 5 V, the detection circuit controls the switch unit to transmit the process information to the EDID ROM, and when the specific voltage is inputted in the detection circuit from the +5V power line and the specific voltage is 0 V, the detection circuit controls the switch unit to transmit the process information to the processor. When the specific voltage is inputted in the detection circuit from the HPD line and the specific voltage is 5 V, the detection circuit controls the switch unit to transmit the process information to the EDID ROM, and when the specific voltage is inputted in the detection circuit from the HPD line and the specific voltage is 0 V, the detection circuit controls the switch unit to transmit the process information to the processor. When the specific voltage is inputted in the detection circuit from the utility line and the specific voltage is 0 V, the detection circuit controls the switch unit to transmit the process information to the EDID ROM, and when the specific voltage is inputted in the detection circuit from the utility line and the specific voltage is 9, 14, or 21 V, the detection circuit controls the switch unit to transmit the process information to the processor.

The invention provides a method for signal input control, adapted for a control device controlling a signal input of a video device through a HDMI. The method includes the following steps: the control device provides a process information and a control command; the video device detects the control command of the control device; the switch unit of the video device receiving the process information through a DDC; and the video device controls a connection mode of the switch unit according to the control command, the connection mode being respectively a normal mode and a specific mode, in which the normal mode is for transmitting the process information to an EDID ROM in the video device through the switch unit, and the specific mode is for transmitting the process information to a processor in the video device through the switch unit.

The invention provides a video device, adapted for a HDMI, the video device receiving a process information and a control command provided by a control device. The video device includes a switch unit, an EDID ROM, a processor, and a detection circuit. The switch unit receives the process information through a DDC. The detection circuit detects the control command of the control device. Moreover, the detection circuit controls a connection mode of the switch unit in the video device according to the control command, the connection mode being respectively a normal mode and a specific mode, in which the normal mode is for transmitting the process information to the EDID ROM through the switch unit, and the specific mode is for transmitting the process information to the processor through the switch unit.

In summary, embodiments of the invention provide a system and a method for signal input control and a video device thereof. In the communication structure between the control device and the video device, the currently available DDC in the HDMI that only transmits the EDID can further transmit process information such as the low speed common peripheral protocol commands needed by the system design.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A-3C are tables corresponding to different input specific voltages for switching the connection mode according to an embodiment of the invention.

DESCRIPTION OF EMBODIMENTS

Figure 1:
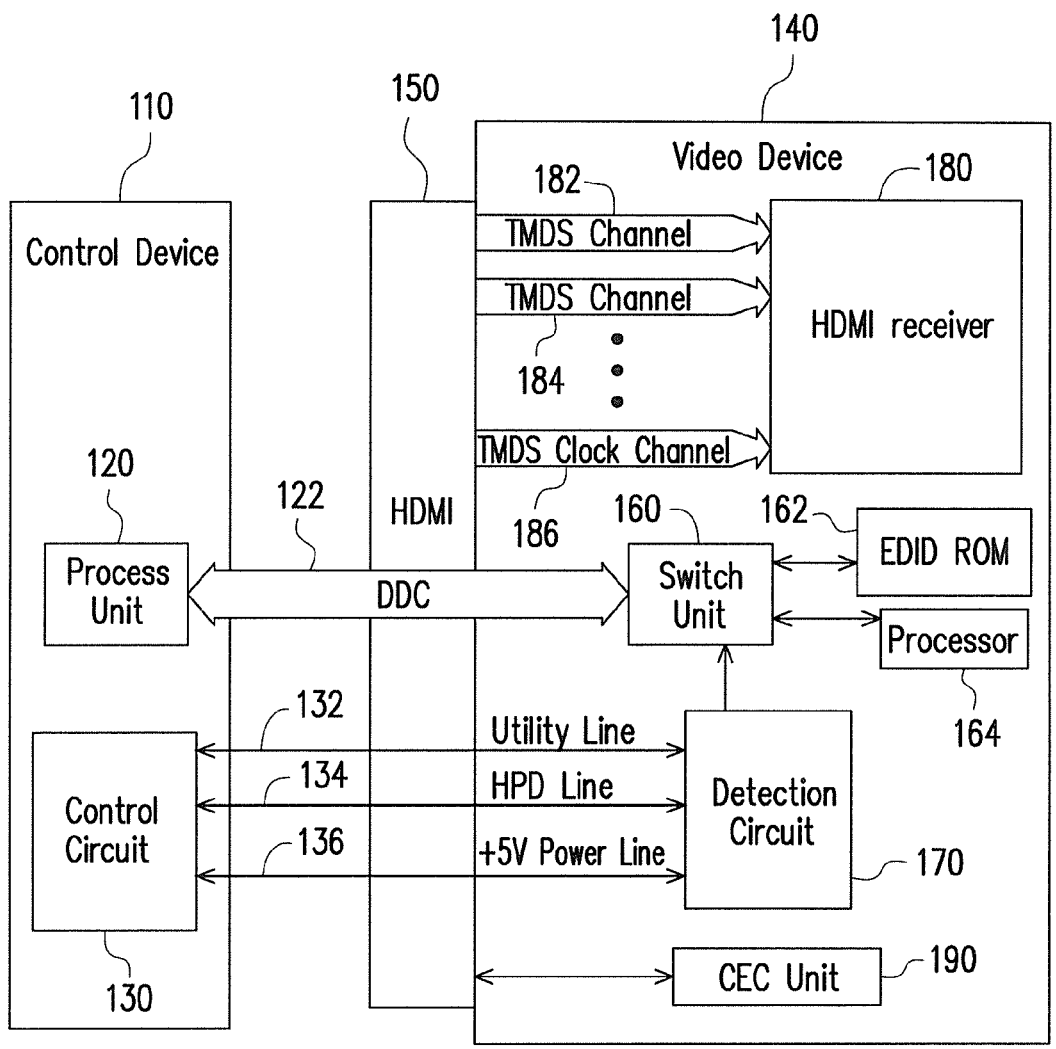
FIG. 1 is functional block diagram of a system for signal input control according to an embodiment of the invention.

FIG. 1 is functional block diagram of a system for signal input control according to an embodiment of the invention. The system for signal input control is adapted for signal transmission through a High Definition Multimedia Interface (HDMI). The system for signal input control includes a control device 110 and a video device 140, in which the control device 110 uses a HDMI 150 to connect to the video device 140. The control device 110 includes a process unit 120 and a control circuit 130. The video device 140 includes a switch unit 160, an Extended Display Identification Data (EDID) ROM 162, a processor 164, and a detection circuit 170, in which the EDID ROM 162, the processor 164, and the detection circuit 170 are coupled to the switch unit 160.

The process unit 120 in the control device 110 provides a process information transmitted to the switch unit 160 of the video device 140 through a Data Display Channel (DDC) 122. The control circuit 130 provides a control command, and the control command may be a specific voltage, such as an adjustable voltage, for example. According to a value of the specific voltage, the switch unit 160 is controlled to transmit the process information to the EDID ROM 162 or the processor 164.

The video device 140 uses the detection circuit 170 to connect to the control circuit 130 through a utility line 132, a Hot Plug Detection (HPD) line 134, or a +5V power line 136 of the HDMI 150. After the detection circuit 170 detects the specific voltage, the detection circuit 170 changes a connection mode of the switch unit 160 according to the specific voltage, in which the connection mode determines whether to transmit the process information to the EDID ROM 162 or the processor 164.

The video device 140 further includes a HDMI receiver 180 and a Consumer Electronics Control (CEC) unit 190. An externally connected video signal source can transmit a video signal to the HDMI receiver 180 through a plurality of Transition Minimized Differential Signaling (TMDS) channels 182 and 184 and a TMDS clock channel 186. The CEC unit 190 is an one wire, two way interface that is custom designed according to requirements so as to allow a user to control the various types of electronic devices connected with the HDMI 150.

Figure 2:
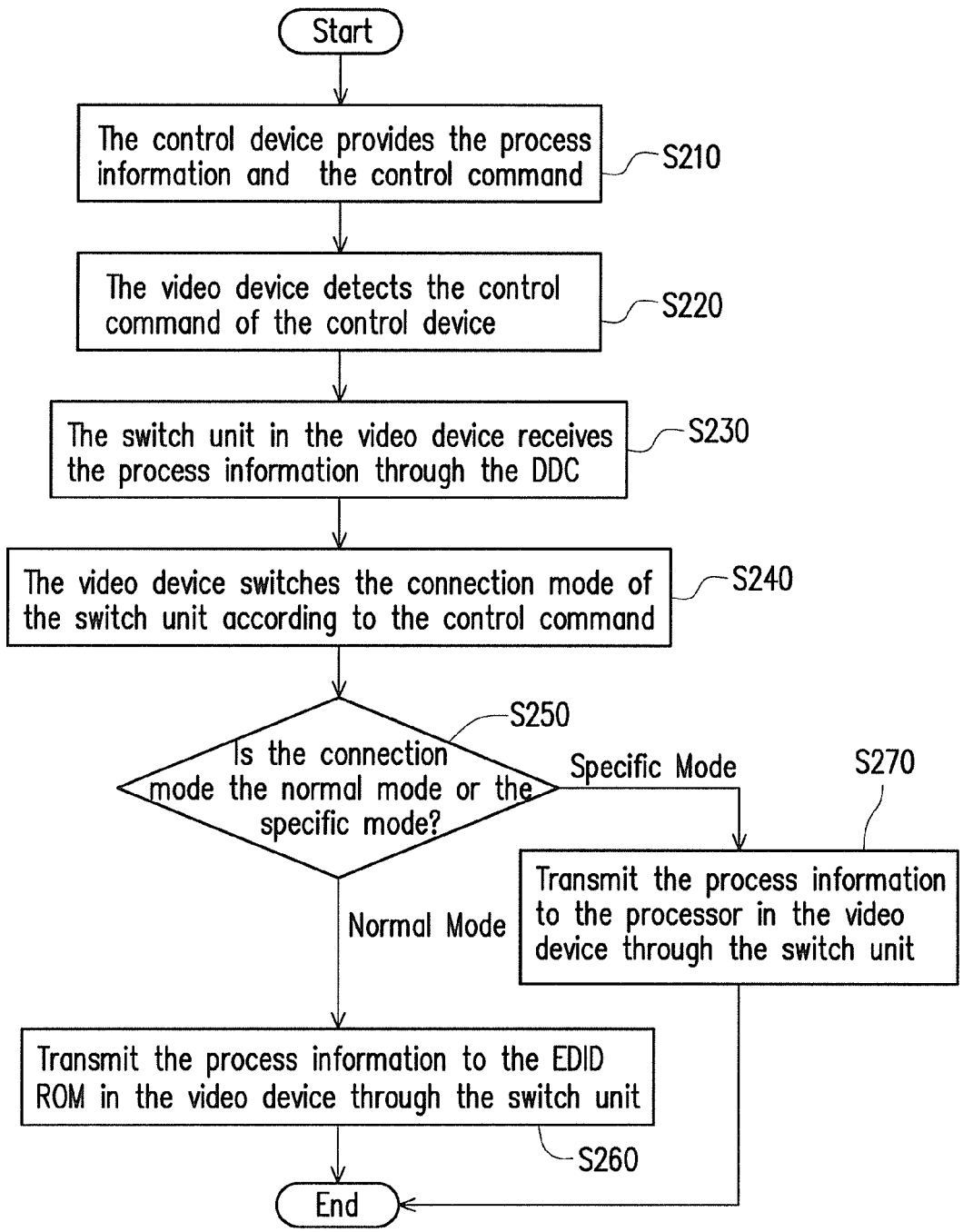
FIG. 2 is a flowchart illustrating a method for signal input control according to an embodiment of the invention.

FIG. 2 is a flowchart illustrating a method for signal input control according to an embodiment of the invention. Please refer to FIGS. 1 and 2. The process unit 120 of the control device 110 provides the process information and the control circuit 130 of the control device 110 provides the control command (Step S210), in which the process information controls the operation of the EDID ROM 162 and the processor 164. The detection circuit 170 of the video device 140 detects the control command provided by the control circuit 130 of the control device 110 (Step S220). As described earlier, the control command may be a specific voltage. Moreover, the detection circuit 170 detects the specific voltage provided by the control circuit 130 through the utility line 132, the HPD line 134, or the +5V power line 136.

The switch unit 160 in the video device 140 receives the process information through the DDC 122 (Step S230). Moreover, the detection circuit 170 in the video device 140 controls the connection mode of the switch unit 160 according to the control command (e.g., the specific voltage) (Step S240), and then determines whether the connection mode is a normal mode or a specific mode (Step S250).

FIGS. 3A-3C are tables corresponding to different input specific voltages for switching the connection mode according to an embodiment of the invention. Please refer to FIGS. 3A-3C. As shown in FIG. 3A, when a voltage inputted in the detection circuit 170 through the +5V power line 136 is 5 V, the detection circuit 170 controls a pin S1 and a pin S0 of the switch unit 160 into an ON mode through the internal circuit design of the detection circuit 170, and a "1" state as in a digital circuit representation is preset. When the voltage inputted in the detection circuit 170 through the +5V power line 136 is 0 V, the detection circuit 170 controls the pin S1 and the pin S0 of the switch unit 160 into an OFF mode, and a "0" state is preset. At this time, a variable N is preset by the system. According to the ON or OFF mode of the pin S0 and pin S1 and by using a binary to decimal conversion arithmetic method (e.g., base of S1 is $2^1$, and base of S0 is $2^0$), the variable N can be calculated to be 3 when the input voltage is 5 V, and the connection mode of the switch unit 160 corresponds to the normal mode. When input voltage is 5 V and the variable N is 5, the connection mode of the switch unit 160 corresponds to the specific mode.

Similarly, as shown in FIG. 3B, when a voltage inputted in the detection circuit 170 through the HPD line 134 is 5 V, the detection circuit 170 controls the pin S1 and the pin S0 of the switch unit 160 into the ON mode through the internal circuit design of the detection circuit 170. When the voltage inputted in the detection circuit 170 through the HPD line 134 is 0 V, the detection circuit 170 controls the pin S1 and the pin S0 of the switch unit 160 into the OFF mode. At this time, by using the afore-described operational method, the variable N can be calculated to be 3 when the input voltage is 5 V, and the connection mode of the switch unit 160 corresponds to the normal mode. When input voltage is 0 V and the variable N is 0, the connection mode of the switch unit 160 corresponds to the specific mode.

Moreover, since a load voltage range of the utility line 132 is larger, the utility line 132 has more variations. As shown in FIG. 3C, when a voltage inputted in the detection circuit 170 through the utility line 132 is 0 V, the detection circuit 170 controls the pin S1 and the pin S0 of the switch unit 160 into the ON mode through the internal circuit design of the detection circuit 170. The variable N can be calculated to be 3 when the input voltage is 0 V, and the connection mode of the switch unit 160 corresponds to the normal mode. When the input voltage is 9 V, the detection circuit 170 controls the pin S1 of the switch unit 160 into the OFF mode and the pin S0 into the ON mode. The variable N can be calculated to be 1 when the input voltage is 9 V, and the connection mode of the switch unit 160 corresponds to a first specific mode. When the input voltage is 14 V, the detection circuit 170 controls the pin S1 and the pin S0 of the switch unit 160 into the OFF mode. The variable N can be calculated to be 0 when the input voltage is 14 V, and the connection mode of the switch unit 160 corresponds to a second specific mode. When the input voltage is 21 V, the detection circuit 170 controls the pin S1 of the switch unit 160 into the ON mode and the pin S0 into the OFF mode. The variable N can be calculated to be 2 when the input voltage is 21 V, and the connection mode of the switch unit 160 corresponds to a third specific mode.

By using the aforementioned judging process, when the connection mode of the switch unit 160 is determined to be the normal mode, the process information is transmitted to the EDID ROM 162 in the video device through the switch unit 160 (Step S260). When the connection mode of the switch unit 160 is determined to be the specific mode, the process information is transmitted to the processor 164 in the video device through the switch unit 160 (Step S270). The input voltages of the utility line 132 have a plurality of specific mode variations. According to system manufacturer requirements, the first specific mode, the second specific mode, and the third specific mode may be respectively defined as the process unit 120 of the control device 110 providing different types of process information to the processor 164 of the video device 140. For example, each type of specific mode respectfully corresponds to the debug or the testing of different hardware equipment or program code.

In view of the foregoing, embodiments of the invention provide a system and a method for signal input control and a video device thereof. In the communication structure between the control device and the video device, the currently available DDC in the HDMI that only transmits the EDID can further transmit process information such as the low speed common peripheral protocol commands needed by the system design. At the same time, the utility line, the +5V power line, or the HPD line in the HDMI are used to transmit the control command, in order to control whether the process command is transmitted to the EDID ROM of the video device through the switch unit, or the process command is transmitted to the processor of the video device through the switch unit.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A system for signal input control, adapted for a High Definition Multimedia Interface (HDMI), the system comprising:
a control device providing a process information and a control command; and
a video device connected to the control device through the HDMI, wherein the video device comprising:
a switch unit receiving the process information through a Display Data Channel (DDC);
an Extended Display Identification Data (EDID) ROM;
a processor; and
a detection circuit detecting the control command of the control device, the detection circuit controlling a connection mode of the switch unit in the video device according to the control command, the connection mode being respectively a normal mode and a specific mode, wherein the normal mode is for transmitting the process information to the EDID ROM through the switch unit, and the specific mode is for transmitting the process information to the processor through the switch unit, wherein the control device comprises:
a process unit providing the process information, the process information being transmitted to the switch unit of the video device through the DDC; and
a control circuit providing the control command, the control command being a specific voltage, the specific voltage being an adjustable voltage, the switch unit being controlled by the detection circuit to transmit the process information to the EDID ROM or the processor according to a value of the specific voltage.

2. The system for signal input control of claim 1, wherein the video device further comprises the detection circuit connecting to the control circuit through at least one of a utility line, a Hot Plug Detection (HPD) line, or a +5V power line of the HDMI, and after detecting the specific voltage, the detection circuit switching the connection mode of the switch unit according to the specific voltage, the connection mode determining whether the switch unit transmits the process information to the EDID ROM or the processor.

3. The system for signal input control of claim 2, wherein, when the specific voltage is inputted in the detection circuit from the +5V power line and the specific voltage is 5 V, the detection circuit controls the switch unit to transmit the process information to the EDID ROM, and when the specific voltage is inputted in the detection circuit from the +5V power line and the specific voltage is 0 V, the detection circuit controls the switch unit to transmit the process information to the processor.

4. The system for signal input control of claim 2, wherein, when the specific voltage is inputted in the detection circuit from the HPD line and the specific voltage is 5V, the detection circuit controls the switch unit to transmit the process information to the EDID ROM, and when the specific voltage is inputted in the detection circuit from the HPD line and the specific voltage is 0 V, the detection circuit controls the switch unit to transmit the process information to the processor.

5. The system for signal input control of claim 2, wherein, when the specific voltage is inputted in the detection circuit from the utility line and the specific voltage is 0 V, the detection circuit controls the switch unit to transmit the process information to the EDID ROM, and when the specific voltage is inputted in the detection circuit from the utility line and the specific voltage is 9, 14, or 21 V, the detection circuit controls the switch unit to transmit the process information to the processor.

6. A method for signal input control, adapted for a control device controlling a signal input of a video device through a HDMI, the method comprising:
the control device providing a process information and a control command;
the video device detecting the control command of the control device;
a switch unit of the video device receiving the process information through a DDC;
the video device controlling a connection mode of the switch unit according to the control command, the connection mode being respectively a normal mode and a specific mode, wherein the normal mode is for transmitting the process information to an EDID ROM in the video device through the switch unit, and the specific mode is for transmitting the process information to a processor in the video device through the switch unit;

a process unit of the control device providing the process information, the process information being transmitted to the switch unit of the video device through the DDC; and a control circuit of the control device providing the control command, the control command being a specific voltage, the specific voltage being an adjustable voltage, the switch unit being controlled to transmit the process information to the EDID ROM or the processor according to a value of the specific voltage.

7. The method for signal input control of claim 6, further comprising:

connecting the control circuit to a detection circuit of the video device through at least one of a utility line, a HPD line, or a +5V power line of the HDMI; and after the detection circuit detects the specific voltage, the detection circuit switching the connection mode of the switch unit according to the specific voltage, wherein the connection mode determines whether the switch unit transmits the process information to the EDID ROM or the processor.

8. The method for signal input control of claim 7, further comprising:

when the specific voltage is inputted in the detection circuit from the +5V power line and the specific voltage is 5 V, the detection circuit controlling the switch unit to transmit the process information to the EDID ROM, and when the specific voltage is inputted in the detection circuit from the +5V power line and the specific voltage is 0 V, the detection circuit controlling the switch unit to transmit the process information to the processor.

9. The method for signal input control of claim 7, further comprising:

when the specific voltage is inputted in the detection circuit from the HPD line and the specific voltage is 5 V, the detection circuit controlling the switch unit to transmit the process information to the EDID ROM, and when the specific voltage is inputted in the detection circuit from the HPD line and the specific voltage is 0 V, the detection circuit controlling the switch unit to transmit the process information to the processor.

10. The method for signal input control of claim 7, further comprising:

when the specific voltage is inputted in the detection circuit from the utility line and the specific voltage is 0 V, the detection circuit controlling the switch unit to transmit the process information to the EDID ROM, and when the specific voltage is inputted in the detection circuit from the utility line and the specific voltage is 9, 14, or 21 V, the detection circuit controlling the switch unit to transmit the process information to the processor.

11. A video device, adapted for a HDMI, the video device receiving a process information and a control command provided by a control device, the video device comprising:

a switch unit receiving the process information through a DDC;

an EDID ROM;

a processor; and a detection circuit detecting the control command of the control device, the detection circuit controlling a connection mode of the switch unit in the video device according to the control command, the connection mode being respectively a normal mode and a specific mode, wherein the normal mode is for transmitting the process information to the EDID ROM through the switch unit, and the specific mode is for transmitting the process information to the processor through the switch unit, wherein the control command is a specific voltage, the specific voltage being an adjustable voltage, the switch unit being controlled to transmit the process information to the EDID ROM or the processor according to a value of the specific voltage.

12. The video device of claim 11, wherein the detection circuit is connected to the control device through at least one of a utility line, a HPD line, or a +5V power line of the HDMI, and after detecting the specific voltage, the detection circuit switches the connection mode of the switch unit according to the specific voltage, the connection mode determining whether the switch unit transmits the process information to the EDID ROM or the processor.

13. The video device of claim 12, wherein, when the specific voltage is inputted in the detection circuit from the +5V power line and the specific voltage is 5 V, the detection circuit controls the switch unit to transmit the process information to the EDID ROM, and when the specific voltage is inputted in the detection circuit from the +5V power line and the specific voltage is 0 V, the detection circuit controls the switch unit to transmit the process information to the processor.

14. The video device of claim 12, wherein, when the specific voltage is inputted in the detection circuit from the HPD line and the specific voltage is 5 V, the detection circuit controls the switch unit to transmit the process information to the EDID ROM, and when the specific voltage is inputted in the detection circuit from the HPD line and the specific voltage is 0 V, the detection circuit controls the switch unit to transmit the process information to the processor.

15. The video device of claim 12, wherein, when the specific voltage is inputted in the detection circuit from the utility line and the specific voltage is 0 V, the detection circuit controls the switch unit to transmit the process information to the EDID ROM, and when the specific voltage is inputted in the detection circuit from the utility line and the specific voltage is 9, 14, or 21 V, the detection circuit controls the switch unit to transmit the process information to the processor.

* * * * *